April 5, 1949.  C. HANSEN  2,466,099
APPARATUS FOR TRANSMISSION OF RADIOTELEGRAPHIC
SIGNALS RELATING TO SEA OR RIVER LEVELS
AT THE SITE OF INSTALLATION
Filed Jan. 8, 1947  3 Sheets-Sheet 1
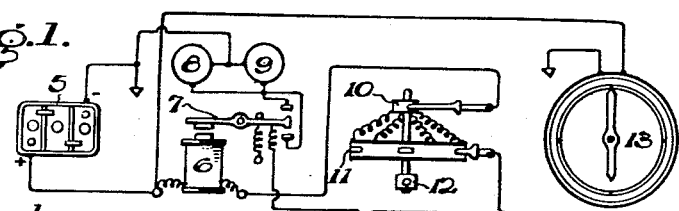
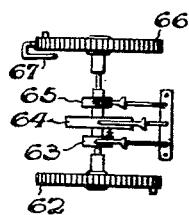
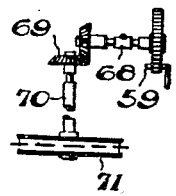
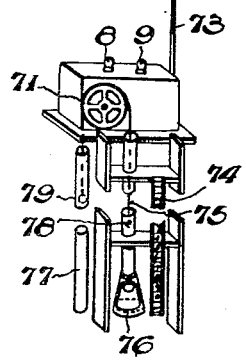
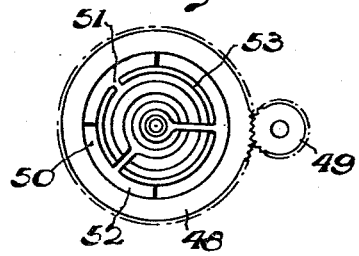
INVENTOR.
Carlos Hansen.
BY
ATTORNEY April 5, 1949.  C. HANSEN  2,466,099
APPARATUS FOR TRANSMISSION OF RADIOTELEGRAPHIC
SIGNALS RELATING TO SEA OR RIVER LEVELS
AT THE SITE OF INSTALLATION
Filed Jan. 8, 1947  3 Sheets-Sheet 2
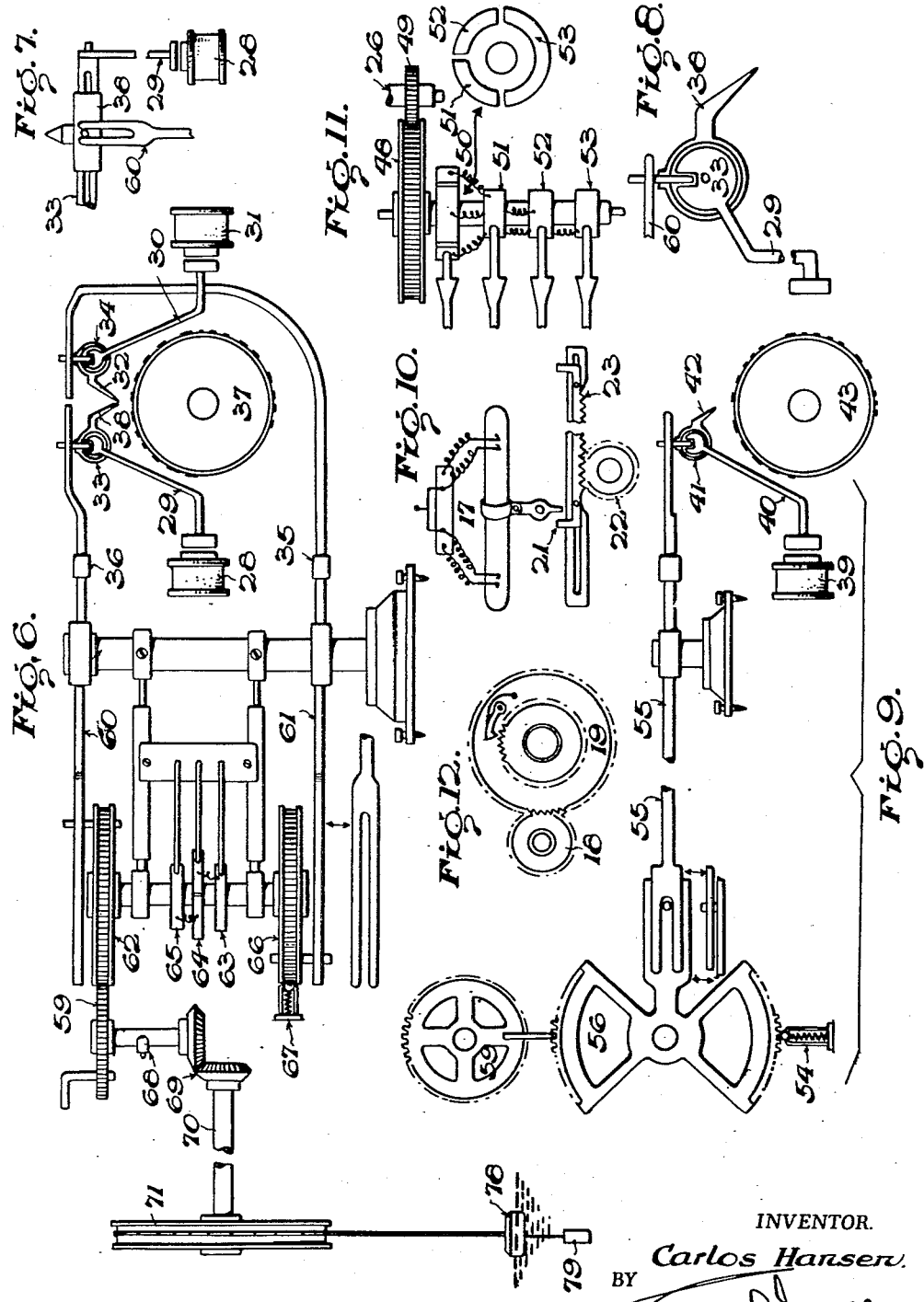
INVENTOR.
Carlos Hansen
BY
ATTORNEY

Fig. 13.

Patented Apr. 5, 1949

2,466,099

UNITED STATES PATENT OFFICE 2,466,099

APPARATUS FOR TRANSMISSION OF RADIOTELEGRAPHIC SIGNALS RELATING TO SEA OR RIVER LEVELS AT THE SITE OF INSTALLATION

Carlos Hansen, Resistencia, Chaco, Argentina

Application January 8, 1947, Serial No. 720,786

10 Claims. (Cl. 177—380)

The present invention refers to a signalling apparatus for the simultaneous automatic emission of radiotelegraphic and optical signals indicating the sea or river level where said apparatus is installed.

The object of the apparatus according to the present invention consists, in the first place, in informing navigators of the water level at the site where, within a few minutes or hours, they are to travel. In the second place, the apparatus is to serve for the drawing up of navigation charts and tidal charts, thus accomplishing a function at present performed by tide gauges or thalassometers and effecting a considerable saving in installation costs and upkeep expenses required for the normal operation of such registers.

The need that is felt for an apparatus of this kind, becomes evident when considering the fact that information regarding the ever changing level of the waters reaches the navigator after a considerable delay. This is due to the fact that he can only know the existing level in ports or places where there are means of communication, it being often subject to conjecture to know whether the river level has dropped or risen. Consequently, navigators can never know the level existing at the so-called "rapids," the majority of which passages are crossed under considerable danger and great precautions, diminishing speed and effecting soundings.

At present, hydrographic work is performed manually, it being necessary to transport, for the purpose, materials and trained staff to the site selected, in order that, at the established periods, the corresponding annotations may be made, the observations being always incorrect where there are tidal phenomena.

By installing the apparatus, according to this invention, instead of the present thalassometers, this latter apparatus will become obsolete as the former requires no attention for changing the paper ribbons where the sea level variations are registered. This register or level data may be heard at a great distance and registered at a central station, the wholly automatic operation of the apparatus requiring no personal attention whatsoever. Although the purpose of the thalassometer is to furnish information which, once analyzed, will assist in the drawing up of sea-level charts, many months in advance, such data is always subject to atmospheric changes, owing to the displacement of the waters due to the wind or a swelling of the river waters, as happens in the River Plate, said data being, in consequence, not rigorously precise, there being no assurance that the level foretold for a certain port, hour and date, will be exact.

The technical and practical difficulties are overcome by applying the new system, owing to the following reasons:

1. Use of the apparatus for river navigation.

Navigators will have available direct and recent information of the river level, and the direction of circulation, of all ports and places considered necessary. By forming a chain of such apparatus, operating at periods of time fixed at will, once every 24 hours or more frequently, it will be possible to draw up a table or guide establishing the time of emission and frequencies for tuning in the respective wavelength. Vessels not yet provided with radiotelegraphic equipment, may also use this service, although not so efficiently as those which are thus equipped, owing to the fact that each apparatus will simultaneously emit luminous optical signs together with the radiotelegraphic transmission, said signals being visible from all angles.

2. Hydrography.

For the execution of tidal charts or similar hydrographic work, the respective radiotelegraphic signals may be received at great distances in order to register the different levels existing at a certain place, thus avoiding the usual watches.

3. Thalassometers.

In the same manner, and by applying the data obtained at a distance, at regular periods, the respective curves may be traced in a central receiving station.

4. Alarm service.

By installing the apparatus in rivers frequently overflowing and causing floods, advance indications will be available of the rapid rise in the waters.

The apparatus described, registers the water level variations by means of a float inserted in a tube provided with the necessary means of protection for preventing the entry of foreign bodies through the bottom of the tube, at the same time avoiding the rocking motion caused by the waves. This float, by means of a chain actuates an upper wheel, according to the changes in the water level, which wheel in turn moves the mechanical system of the apparatus thus obtaining, in accordance with the changes that take place, placement of the respective component units at coincident points of meters and centimeters, a function which is accomplished by means of combinations of gears and levers suitably arranged to that purpose. The only source of power is an accumulator, an element which, owing to the reduced consumption of power by the equipment, ensures long service, which may be further increased by the installation of a wind-driven battery charging outfit, in places where the service is more intensive. The accumulator or storage-battery permanently operates an electric clock, the commutator of which is conveniently provided with a combination of butts specially designed for closing the radiotelegraphic transmitter circuit at the pre-established moments.

When the transmitter is operating, the readings emitted will always be the same, owing to a device with which the apparatus is equipped and which acts as a float-brake or stop. The reading is repeated several times, in view of the fact that the state of the atmosphere may interfere with reception of the signals.

The radiotelegraphic equipment, which forms integral part of the apparatus, is built in accordance with the power demand in each case and the frequency assigned to the transmitter. The assembly is compact and hermetically enclosed in a box. It may be installed without effecting great changes in the present scales for registering the water level.

As an example, and in order to demonstrate the apparatus in one of its preferred embodiments, same will now be described with reference to attached drawings, in which:

Fig. 1 is a diagrammatic view illustrating the entire installation;

Fig. 2 is an enlarged detail elevational view of the gears controlling contacts engaging the first cylinder and a commutator;

Fig. 3 is a detail view of gearing controlled by the water level to be measured and signaled and driving the gears of Fig. 1;

Fig. 4 is an enlarged elevation of a second commutator shown in Fig. 1;

Fig. 5 is a perspective view of the entire installation;

Fig. 6 is an enlarged elevation of the float and mechanism of Figs. 2 and 3 controlled by the position thereof;

Fig. 7 is a detail top plan view of one of the slidable bushings for the first cylinder;

Fig. 8 is an enlarged elevation of the bushing shown in Figs. 6 and 7;

Fig. 9 is a diagrammatic view of mechanism controlling a contact engaging another cylinder.

Fig. 10 is a diagrammatic view in elevation of the switch and the armature operating same;

Fig. 11 is a diagrammatic view of the second commutator in top plan and of the collector rings in elevation and connected to the commutator;

Fig. 12 is an enlarged elevation of gearing driven by the motor and driving the contact cylinders;

Fig. 13 is a wiring diagram of the entire installation in inoperative condition;

Figure 1 illustrates the main unit of the device, as follows:

(1) Connection diagram of the radiotelegraphic transmitter.

(2) Electromagnet, fed by a six-volt current.

(3) Lever provided with a spring and butt, functioning as transmitting key.

(4) Synchronic type vibrator for supplying high tension to the transmitter (1).

(5) Six-volt storage battery, with an earth-connected terminal.

(6) Electromagnet, with one end connected to the storage battery and through which the entire charge of the apparatus passes.

(7) Lever moving on its spindle, provided with a spring and two contact tips at its end.

(8) Coloured light-bulb electrically joined to a contact tip facing lever 7.

(9) Simple six-volt light bulb, electrically united to a contact tip facing lever 7.

(10) Contact ring seating a brush receiving the current passing through the electromagnet 6.

(11) Commutator serving as general switch provided with four stops—three of them shown—for establishing contact every three hours.

(12) Shaft fixed to commutator 11 and ring 10, mechanically coupled to the hour arbor of clock 13.

(13) Electric clock, directly connected to storage battery 5.

(14) Six-volt electric motor.

(15) Six-volt operated thermostatic switch.

(16) Supports and similar arrangements for seating the end of the several shafts.

(17) One-way switch provided with two stops.

(18) Pinion coupled to motor-shaft 14.

(19) Gear with pawl and ratchet, fixed to shaft 26, rotating only in one direction.

(20) Brush, seating on a ring provided on shaft 26.

(21) Inverted U-shaped armature, with little lateral displacement, exerting a pull on switch 17 in the course of its travel.

(22) 25-tooth pinion, fixed to shaft 26 which, on turning, actuates rack 23, to which it is coupled.

(23) Rack, the top portion of which bears one hundred teeth and a tongue which, at the end of the rack's displacement, acts upon armature 21. Sliding motion is effected in a channel cut in the lower portion.

(24) Steel band spring for gathering the power of motor 14.

(25) Unwinding speed regulator of band 24 seating on a metal disc coupled to a centrifugal governor. The shaft of same is provided with a pinion on its end, coupled to gear 27.

(26) Metal main shaft, seating on its ends.

(27) Gear fixed to shaft 26 for transmitting and receiving power from band 24.

(28) Six-volt electromagnet, one terminal connected to earth.

(29) Rod, bent at a 90° angle, with armature fixed to same, to be moved by the action of electromagnet 28, the other end being fixed on guide 33.

(30) Rod similar to rod 29 and fixed to guide 34.

(31) Electromagnet similar to 28 and acting upon rod 30.

(32) Bushing, capable of displacement on guide 34, provided with a tongue which seats on the contact tips peripherically situated on cylinder 37 and provided with a traction pivot on its top middle portion where the end of rod 61 lodges. Said pivot projects from its internal lower portion in order that, on being displaced on guide 34 it may always enter the channel provided to that end, along the same guide 34, on its top part.

(34) Metal rod serving as a guide to bushing 32, mounted on its two ends in such a manner as to permit its lateral rotating displacement when electromagnet 31 is in action. On its top part it is provided with a deep lengthwise slot for receiving the pivot mounted on the middle and top part of bushing 32, said pivot to be able to slide within said slot.

(33) Rod similar to 34 above on which bushing 38 slides and also permitting lateral rotation when electromagnet 28 is in operation.

(35) Fixed insulating bushing, to which is coupled the extension of rod 61.

(36) Fixed insulating bushing, similar to 35 above, to which the extension of rod 60 is coupled.

(37) Hollow metal cylinder, jointly moving with main shaft 26, parallelly situated on the lower portion of rods 33 and 34, having Morse signals engraved on its periphery and according to the direction of its rotation, including signals from 1 to 99 centimeters.

(38) Bushing sliding along rod 33, having the same features as 32.

(39) Six-volt electromagnet, one end earthed, similar to 28 and 31,

(40) Rod similar to 29 and 30 which, on being attracted by electromagnet 39 causes the rotating lateral movement of guide 41 and arranges that bushing 42, sliding on same, seat the tongue with which it is provided on the Morse signals inscribed on the surface of meter-indicating cylinder 43.

(41) Rod, similar to 33 and 34, of smaller size, seating in two supports similar to 16, by its ends, thus being able to execute a lateral rotating movement when electromagnet 39 is in operation.

(42) Bushing similar to 32 and 38, displaceable on rod 41, provided with a tongue resting on cylinder 43, when electromagnet 39 is in action, and by means of rod 40.

(43) Cylinder similar to 37, shorter, fixed to main shaft 26, with Morse signals as from the words "Below zero" up to: "10 meters" or more, according to the height that may be registered at the place where the apparatus be located.

(44) Six-volt electromagnet, one end earthed, for moving the armature of rod 45.

(45) Rod, which on being attracted by electromagnet 44 brings about the rotating displacement of rod 47, on its independent shafts. This rod is in one piece, carrying no displaceable bushing, as is the case with the former rods 41, 32 and 33.

(46) Cylinder, similar in its features to those of cylinders 37 and 43, shorter than these and fixed to main shaft 26, peripherically provided with Morse signals, specifying the place where the apparatus is installed, in order to identify same.

(47) Simple rod carrying a tongue contacting cylinder 46 when rotating due to the action of electromagnet 44.

(48) 100-tooth gear, coupled to pinion 49, fixed to a shaft seating on its ends. It turns at 90° when pinion 49 executes a 360 degree turn.

(49) 25-tooth pinion, fixed to the main shaft 26 and mechanically coupled to gear 48.

(50) Commutator, divided in three sections or segments. One at 180 degrees and two at 90 degrees each, fixed to the spindle of gear 48, where a brush continuously seats, conducting the current received in the second movement of switch 17.

(51) Ring, permanently contacting the 90 degree segment of commutator 50.

(52) Ring, similar to the former (51), electrically joined to the other 90 degree segment of commutator 50.

(53) Ring, similar to 51 and 52, electrically joined to the 180 degree segment of commutator 50.

(54) Steel spring seating on the teeth with which segment 56 is provided on its lower portion, serving as a ratchet and exactly placing the end of rod 55, which displaces bushing 42 mounted on rod 41. This bushing 42 is provided with a tongue for contacting electrically the Morse signals inscribed on cylinder 43, indicating meters.

(55) Metal rod, moving on a shaft, provided with two forks, its function being to transmit the movements of segment 56 to bushing 42.

(56) Segment, laterally displaceable, turning on a shaft, provided on its upper part with equal notches, the number of such notches varying according to the number of meters of water cylinder 43 is to indicate. Each movement is opposed by means of spring 54.

(57) Six-volt electromagnet, one end earthed, for actuating brake-lever 58.

(58) Lever actuated by relay or electromagnet 57, turning on a spindle, with a spring on one end, urging it from said electromagnet, exerting pressure by means of a slider resting on shaft 68, shown in Figure 3.

(59) Wheel mounted on the end of a shaft and provided at one end with a projecting finger which, at each turn effected by said wheel, is to move a notch on segment 56, mounted on its lower portion. This wheel is provided with 200 teeth, being mechanically coupled by these to a wheel 62, mounted on its upper portion. It turns on shaft 68, and at the other end is fixed to a pinion 69, both shown in Figure 3.

(60) Rod, provided on its ends with forks, turning on an axle. One end is moved by means of a pivot conveniently situated at one edge, and on the upper part of wheel 62; said pivot keeps its relation regarding the arc or curve described by the rod in its movements, essentially by the traction of bushing 38, acting on the fork at the other end.

(61) Rod, operating in a similar fashion to the former, mounted on the other end of shaft of rod 60, somewhat longer and passing beneath cylinder 37, suitably bent, also terminating in a fork-like shape, in order to transmit to bushing 32 the traction movements on rod 34. The other end of this rod 61, also finishes in a fork, lodging the pivot suitably placed on the lower outside edge of wheel 66, shown in Fig. 2. Said wheel 63 follows the movements of wheel 62, mounted on the same shaft, as may be seen from Figure 2. The pivot of wheel 66 is equidistant from the center of the shaft, at a distance suitably smaller than the pivot situated on wheel 62, in order that the curve which, in its displacement, it obliges rod 61 to follow, may be proportionate to the curve followed by rod 60, in such a manner that, after a 180 degree turn of wheel 62, bushing 32 may also arrive at the other end of rod 34.

(62) Wheel provided with 400 teeth and having with regard to wheel 59 a relation of 1 to 2; fixed to a spindle and mounted on the end of same, being provided, at one edge and on the top part with a pivot housing the end of rod 60 and which on turning in any direction causes bushing 38, mounted on rod 33, to slide. When wheel 62 effects a 180 degree turn, it exerts a pull on bushing 38, at the other end of rod 33.

(63) Ring, permanently electrically connected, seating a brush transmitting the current received from commutator 64 to electromagnet 28.

(64) Commutator divided into two 180 degree segments, receiving current from ring 51.

(65) Ring similar to 63 receiving current from the other 180 degree segment of commutator 64 and through a brush seated on same transmits it to electromagnet 31. This ring 65, as also commutator 64 and ring 63, move together with wheels 62 and 66, being mounted on the same shaft as said wheels, as may be seen in Fig. 2.

Figure 2 illustrates the manner of mounting the two wheels and commutator described by Figure 1, as follows:

(62) Side view of wheel governing fork 60, showing the position of traction pivot of same.

(63) Contact ring shown in Figure 1.

(64) Commutator showing segments as described in Figure 1.

(65) Contact ring described in Figure 1.

(66) Side view of wheel governing fork 61, not shown in Figure 1, illustrating the placement of the traction pivot of same, situated at 180 degrees difference with regard to the pivot on wheel 62.

(67) Spring pressing on the toothed rim of wheel 66 and which, when the assembly revolves, enters the 99 slots, one at a time, of the toothed portion, provided with 100 teeth, of said wheel, its object being to cause the respective butts mounted on cylinder 37 to be brought into coincident contact with the end of each fork governing wheels 62 and 66, respectively. It should be remembered that 99 Morse signals are circularly arranged on the surface of centimeter-indicating cylinder 37.

Figure 3 shows the coupling arrangement of the apparatus with an outside wheel, as follows:

(68) Shaft consolidating the motion of pinion 69 with that of wheel 59, seating the brake slider with which lever 58, described in Figure 1, is provided.

(69) Symmetrical pinions, mechanically coupled, causing the simultaneous rotation of shafts 68 and 70.

(70) Shaft on which wheel 71 revolves, coupled by means of pinion 69 to shaft 68.

(71) Wheel mounted on the end of shaft 70, consolidated with same and, by means of pinions 69, transmitting its rotations to the interior of the apparatus. Its total circumference measures one meter at its grooved portion, where it is surrounded by a chain provided with a float and counterweight at its respective extremities. Its channeled part is provided with stops for preventing eventual sliding of the chain.

Figure 4 is a diagrammatic cut of commutator 50, described under Figure 1, showing the relations existing between said commutator and the several rings to which it is electrically joined at its 90 and 180 degree portions, respectively.

Figure 5 shows the exterior perspective of the assembled apparatus, in which:

(72) Housing enclosing the entire system and built to withstand all weather conditions.

(73) Antenna for radiotelegraphic radiation.

(74) Ordinary metric scale, serving to synchronize the apparatus when same is installed.

(75) Tube of metal or other appropriate substance, housing the float 78.

(76) Protective screen, adequately perforated, situated in the lower portion of tube 75 and through which the water, whose level is to be measured, enters and leaves.

(77) Hollow tube, closed at its bottom and serving to protect the path which lead or counterweight 79 follows internally.

(78) Float sliding within tube 75 and joined to counterweight 79 by means of chain surrounding wheel 71, moving same according to the rise and fall of the waters.

(79) Counterweight sliding within tube 77 and consolidating the movements of wheel 71 and float 78 by tensing the intercommunicating chain.

Figure 6 shows the float 78 floating on the water surface, the level of which is to be measured and signaled. The float is connected by a chain to a counterweight 79 and to a wheel 71 around which the chain is wrapped. The wheel is fixed to shaft 70 driving another shaft 68 by bevel gearing 69. Shaft 68 is rigid with wheel 59 controlling sector 56 and meshing with wheel 62. The same controls by levers 60, 61 the position of bushings 38 and 32, respectively, and rotates with the commutator 64 and rings 63 and 65.

Figure 7 shows in plan bushing 38 slidable lengthwise of guide rod 33 rotated by rod 29. The same is moved by electromagnet 28.

Figure 8 shows on a larger scale the detail structure of Fig. 7 in elevation.

Figure 9 shows wheel 59 driving the sector 56 which controls through lever 55 the movement of bushing 42 lengthwise of guide rod 41. The latter is rotated by rod 40 moved by electromagnet 39. Bushing 42 is equipped with a finger adapted to engage the second drum 43.

Figure 10 illustrates the switch 17 controlled by an inverted U-shaped armature 21. A pinion 22 fixed on shaft 26 meshes with a rack 23 and is provided with a tongue which at the end of the rack's displacement acts on the armature.

Figure 11 shows in top plan view the second commutator 50 and three collector rings 51, 52, 53, each connected to a segment of the commutator.

Figure 12 shows in elevation gear 18 on the motor shaft and meshing with gear 19 connected by pawl and ratchet to shaft 26 for rotating same in one direction.

Figure 13:
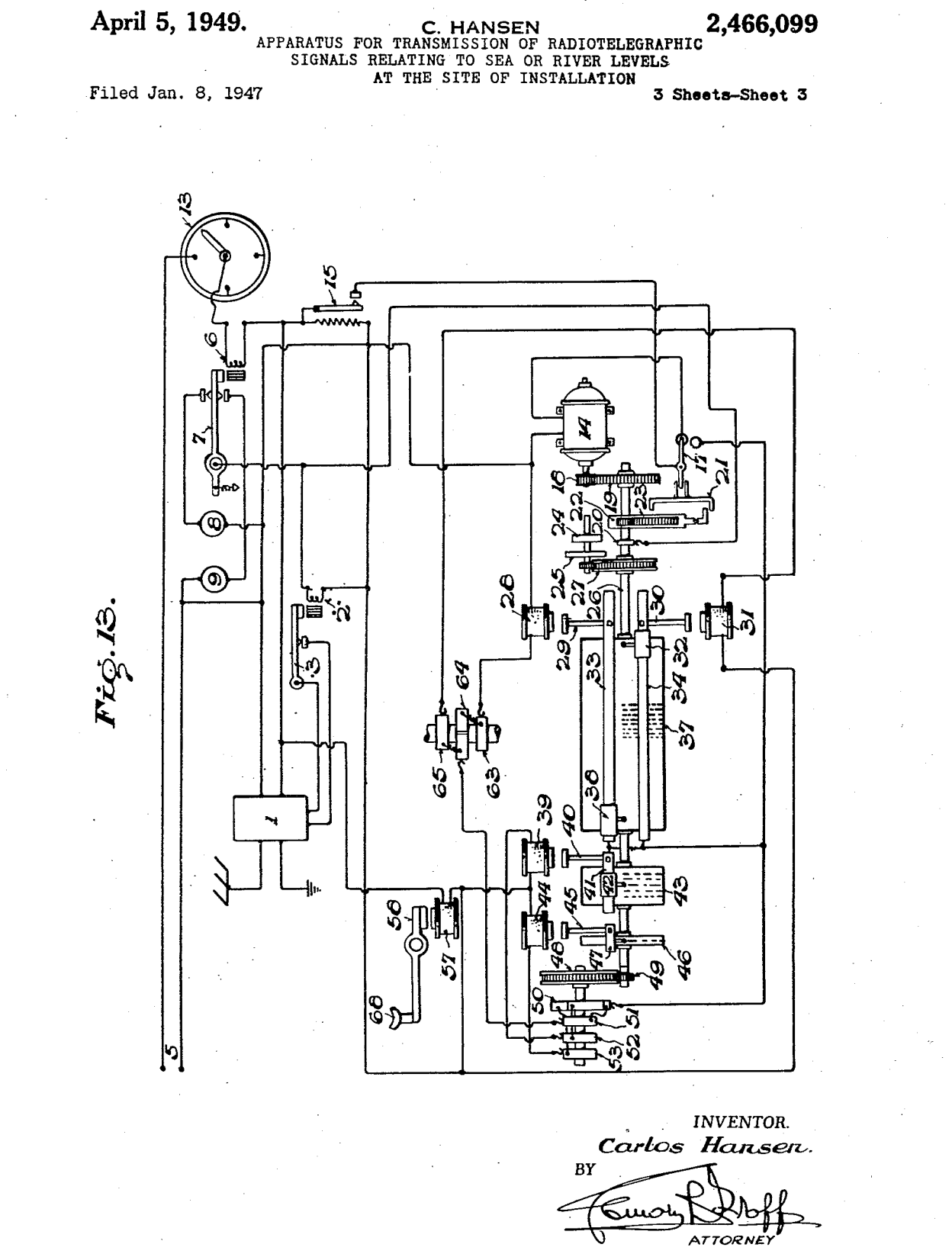

Figure 13 is a wiring diagram of the installation in inoperative condition.

A coil 2 of an electromagnet when energized operates the transmitting key.

The six-volt storage battery 5 is permanently connected to clock 13 and is thereby connected in predetermined intervals to one end of coil 6 of an electromagnet. The energization of coil 6 disengages lever 7 from one fixed contact and engages it with another contact. Lever 7 is connected to the other side of coil 2 and shaft 26. The first contact of lever 7 is connected to a colored electric bulb 8 and the second one to an ordinary bulb.

The other end of coil 6 is connected to a thermostatic switch 15 and a resistance heating the same to assume a certain shape establishing connection to a conductor connected to switch 17.

Lever 7 is also connected to one side of the motor 14, the other side of which is connected to a fixed contact engaged by lever 17 in one position. Another fixed contact for lever 17 is connected to commutator 50.

One commutator segment is connected by collector ring 51 to commutator 64. A second segment of commutator 50 is connected by collector ring 52 to the coil of electromagnet 39. The third segment of commutator 50 is connected by collector ring 53 to the coil of electromagnet 44. The other ends of the coils of electromagnets 39, 44 are connected to one end of the coil of electromagnet 57. The other end of this coil is connected to the transmitter 1.

One segment 63 of commutator 64 is connected to one side of electromagnet 28, the other side of which is connected to the motor. The other segment 65 of commutator 64 is connected to the coil of electromagnet 31 the other side of which is connected to the coil of electromagnet 57, coil 2 and the resistance for switch 15.

The second fixed contact for lever 17 is connected to bushings 32 and 38 by the respective guide rods 34, 33 for these bushings and to shaft 26.

*Function of a section of the apparatus affected solely by the changes in the liquid-level to be measured*

Float 78 of Figure 5 rises and falls; by means of a chain said rising or falling, brought about by changes in the liquid-level to be measured, actuates wheel 71, the circumference of which is one meter long. This wheel, revolving on spindle 70 shown in Figure 3, moves pinions 69, said pinions being duplicates of one another, as well as wheel 59. This wheel 59 will effect one 360 degree, or complete turn, for each meter float 78 may have risen or fallen. At the same time it has caused the displacement of segment 56 through one notch (Figure 1) by means of the finger with which it is equipped, this movement being opposed by spring 54 and causing bushing 42 to coincide with a certain signal on cylinder 43 by means of rod 55. Simultaneously, through the turning of wheel 59, wheel 62 is turned and, same being fixedly joined to 66, by means of their respective pins, forks 60 and 61, respectively, are caused to move. Wheel 59 having given one complete turn, wheel 62, having twice the number of teeth, will have given one half a turn and bushings 32 and 38 will have travelled over the entire length of rods 33 and 34. If bushing 42 fixes a position at, for example, five meters, and the level has risen 25 centimeters, wheel 59 will give one quarter of a turn and bushing 38, through the action of rod 60, will be positioned over the Morse signal corresponding to 25 centimeters, as inscribed on cylinder 37. Also, bushing 32, through the action of rod 61, will be positioned at the 75 centimeter signal on cylinder 37. Now, as the signal really to be transmitted is of 5 meters 25 centimeters, commutator 64, its motion consolidated with that of wheels 62 and 66 and being divided into two 180 degree segments, causes the brush seating on same to send to ring 63 the current received from ring 51, thus assuring that, at the moment when the signal is transmitted and the other section of the apparatus begins to operate, rod 33, revolving around its own axis, cause the tongue of bushing 38 to seat on the Morse butts inscribed on cylinder 37, said operation taking place by means of electromagnet 28 on rod 29. The 25 centimeter signal has been fixed by the pressure exerted by spring 67 on wheel 66. Supposing the level to have fallen 25 centimeters, the movement of wheel 59 to the one mentioned, causing the pivot with which it is provided to act upon a notch of segment 56 and, by means of rod 55, to displace bushing 42 to the 4-meter sign, this position being fixed by the pressure exerted on the lower portion of segment 56 by spring 54. Wheel 62 having also moved, in the opposite direction, bushing 32 has also slid to the 75 centimeter position, but rod 34 is the one acting at the instant when transmission takes place, owing to the fact that commutator 64, which turned simultaneously with wheels 62 and 66, in the opposite direction, sends the current received from ring 51 to ring 65, electromagnet 31, consequently, acting upon rod 30. In this case, the signal marked is 4 meters 75 centimeters. The case may come up where the brush of commutator 64 seats just over the insulating portion dividing it in two sections, and this will occur when the level to be transmitted by the apparatus is exactly any given number of meters, without any fraction measurable in centimeters. Under such circumstances, logically, no current will flow to rings 63 and 65. The Morse signals corresponding to the first centimeters of the meter being arranged on the lower part of cylinder 37, and the signal corresponding to 99 ending on the upper portion, the pivot situated on wheel 59 places itself as shown in Figure 1, corresponding to an exact number of meters, and commutator 64 sends no current to the rings. This position corresponding to five meters, and the level falling by one centimeter, the pivot on wheel 59 causes the displacement of segment 56, sending bushing 42 to the 4-meter position and, as wheel 62 has also been moved thereby, by means of pivot on wheel 66 and rod 61, bushing 32 is placed on the corresponding 99-centimeter signal, the arrangement being now such that on transmission the radiotelegraphic signal be 4 meters 99 centimeters. In the opposite case, that is, if the level should rise one centimeter above the five meter mark mentioned, the pivot of wheel 59 has left this measure in its original position by means of segment 56 on bushing 42 and, turning in the contrary direction, causing wheel 62 and commutator 64 to move, the latter sending current to ring 63, arranges that at the moment of transmission electromagnet 28 act upon rod 33 causing bushing 38 to contact. In this manner, the 5-meter 1-centimeter mark is fixed. The alternative function of bushings 32 and 38, when a mark to be transmitted passes from one meter to another, is assured by the division existing in commutator 64, said division comprising segments of 180 degrees each, and both one or the other bushing makes measurements of one centimeter or more or 99 centimeters or less, it being arranged, for example, that when a mark passes from 5 meters 99 centimeters to 6 meters 1 centimeter, bushing 32 operates up to 99, and after segment 56 has marked the 6-meter level, through the action of the same wheel 59 bushing 38 commences to operate, owing to the fact that commutator 64 ceases sending current to ring 65, sending it, instead, to ring 63. Should the level continue rising, bushing 38 will arrive at the other extreme of rod 33 and bushing 32 to the end of the rod 34. Bushing 38 is thus set to mark 99 centimeters and bushing 32, 1 centimeter, after brush seating on commutator 64 passes the insulating dividing portion. Both bushings, 32 and 38, act independently within the fractions of the meter, and the function of one of them changes only when passing from one meter to another. The changes in the water level are registered by the apparatus in accordance with the motions described and, when a signal registered is to be transmitted, the mechanism described is paralyzed when electromagnet 57 acts, said electromagnet, by means of lever 58 provided with a slider at its end, seating on shaft 68, shown in Figure 3, in order that, should there be waves or changes in the water level, the reading, which is repeated several times, may be the same during that period. Electromagnet 57 ceases functioning when the radiotelegraphic transmission is cut, the mechanism being, consequently, set free.

*Operation of the apparatus in accordance with attached plan*

Electric clock 13, shown in Figure 1, is in constant operation owing to being connected permanently to storage battery 5 shown in the same figure. A commutator 11 is connected to the hour arbor of said clock, by means of shaft 12. Ring 10 receives, by means of bush seating on same, the current passing through electromagnet 6, derived from storage battery 5. Ring 10 passes the current received to four stops provided on commutator 11. The brush seating on commutator 11, on the turning of shaft 12, passes the current received to thermostatic switch 15, electromagnet 57 and vibrator 4 of the transmitter, at which points the transmitting valve filaments are to be connected. The time that passes while these valves commence to oscillate, is synchronized with the action of thermostatic switch 15, in order that the latter permit the passage of the six-volt current received when the transmitter is in operating conditions, remaining in this state while commutator 11 allows the passage of the electric current. The six volts received from commutator 11 through independent stops causing it to operate, are connected and passed on to switch 17 through the mobile route and by means of a stop seating same connects motor 14 which, on the rotation of pinion 18, by means of gear 19 causes shaft 26 to turn which now, through pinion 22 equipped with 22 teeth, exerts a pull on rack 23 provided with 100 teeth. Also by means of gear 27, steel cord 24 was wound when shaft 26 rotated. Shaft 26 can only turn 4 complete revolutions, owing to the fact that pinion 22, having 25 teeth, brings about the displacement of rack 23 which, being provided with a tongue, and same pressing on the side of armature 21, causes same to slide and causes switch 17 to cease sending current to motor 14, the current flowing to the other stop electrically connected with rods 33, 34, 41 and 47 respectively, as well as with the brush seating on commutator 50. Motor 14, therefore, is left without current and cord 24 commences to operate causing shaft 26 to turn in a direction opposite to the former one. At this moment, the brush seating on the 180 degree segment of commutator 50, sends the current received to ring 53, which immediately thereupon acts on electromagnet 44, causing same to seat rod 47, by means of rod 45, on the Morse stops of cylinder 46. Rod 47 being fed by six volts, through bushing, and when same seats on the stops of the cylinder this part, by means of its metal shaft sends the current to ring 20 mounted on the same shaft which, through brush seating on same, sends it to electromagnet 2 which brings about the action of the transmitter key lever 3. Lever 3 will be attracted during a longer or shorter period, according to the lengths of the stops, representing Morse signals, provided on cylinder 46, bringing about the closure of the radio telegraphic transmitting circuit each time an attraction occurs, and in accordance with the turning speed of shaft 26, which action is controlled by the operation of regulator 25. When cylinder 46 goes through a complete rotation, it transmits the entire signal corresponding to the site where the apparatus is installed, kilometer number of port in question. During this transmission period, simultaneously, light bulb 9 comes into effect, emitting luminous Morse signals, lasting for the same period of time as arranged by the operation of lever 3, owing to the fact that the same current operating electromagnet 2 is connected to lever 7. Lever 7 contacts the stop corresponding to light bulb 9 being, as it is, attracted by electromagnet 6, which is connected in series with the entire electrical consumption of the system. After the storage battery has lost part of its charge, the ampere consumption of the apparatus will diminish and, consequently, electromagnet 6, being in series, will not have sufficient strength to overcome the resistance offered by the spring situated at the end of lever 7, and said lever will be seated on the stop corresponding to light bulb 8, and the coloured light emitted by same will call attention to the fact that a replacement storage battery is needed. For all this transmitting process, cylinder 46 gives one complete turn, and will repeat the same signal owing to the fact that tongue 47, seated thereon, will not lift because, as the 180 degree segment of commutator 50 is contacted, same will continue supplying current to ring 53. It should be borne in mind, in this connection, that pinion 49, whose motion is consolidated with that of the cylinders, is equipped with 25 teeth and coupled to gear 48, having 100 teeth. Therefore, when pinion 49 gives two complete turns, repeating the location signal of the apparatus, gear 48, the motion of which is consolidated to that of commutator 50, will have given half a turn, i. e., 180 degrees. The commutator having run through 180 degrees, the flow of current ceases in this segment and the butt seating on cylinder 46 lifts because electromagnet 44 is without current. Ring 52 then receives current from the 90-degree segment of commutator 50 and cylinder 43 continues turning owing to the action of cord 24. When this contact takes place, ring 52 passes the current to electromagent 39, which through rod 40 acts on rod 41, causing same to turn on its spindle and the tongue of bushing 42 to seat on the Morse stops inscribed on cylinder 43, i. e., the meter indicating cylinder. These stops or butts are electrically joined to shaft 26 and, as in the former process, pass the current they receive to brush seating on ring 20, from there to lever 7 and electromagnet 2, simultaneously, which is when the height in meters is transmitted, according to the position in which cylinder 43 be fixed by segment 56. In order to fulfill this development, cylinder 43 gave one complete turn and, corresponding to the third complete turn of shaft 26, gear 48 gave ¾ of a turn, i. e., 270 degrees: 180 degrees in the transmission process locating the apparatus, and 90 degrees when transmitting the signal indicating the level in meters. Immediately following, ring 52 being left without current, electromagnet 39 ceases operating, causing tongue of bushing 42 to lift from the butts on cylinder 43, where it had been seating. It happens that cylinder 37 continuing to turn as in former cases, contact is brought about on the last 90-degree segment of commutator 50, sending current to ring 51. This ring, in turn, passes the flow on to commutator 64 through the brush seating on same. If the meters registered by segment 66 are exact, without fractions, said brush seats on the insulating portion dividing commutator 64 in two 180-degree segments, no current, therefore, being sent to rings 63 and 65. If fractions in centimeters are registered, both bushes, 32 and 38, will remain on the corresponding centimeters, and commutator 64, according to the position to which it may have been sent by wheel 62, will send current towards rings 63 or 65, actuating electromagnets 28 or 31 in order that, through rods 29 or 30, rods 33 or 34 be caused to turn on their spindles, obliging the tongues of bushes 32 or 38, respectively, to seat on the butts inscribed as Morse signals on cylinder 37, thus sending the six-volt current, also present in rods or guides 32 or 34, through shaft 26, to ring and brush 20, mounted on said shaft, in this manner operating electromagnet 2 and light bulb 9 and transmitting the signal corresponding to centimeters. The transmission being over, cylinder 37 and shaft 26 have accomplished their fourth and last rotation, coinciding with the 360-degree rotation of commutator 50, which operation was controlled at the fourth turn of pinion 49 and one turn of gear 48, said pinion having 25 teeth and the gear, 100 teeth. Commutator 50 has also ceased sending current to ring 51 and tongues of bushings 32 or 38 are thus lifted, whichever one may have been in action, once electromagnet 28 or 31 ceases to function. In this transmitting process, pinion 18 has not rotated, which is due to the fact that gear 19 is equipped with a pawl and ratchet device permitting it to turn in one sense only. Shaft 26, having gone through the four turns previously described, consisting of two turns transmitting the location of the apparatus; one turn transmitting meters and a fourth turn transmitting centimeters, has also succeeded, through pinion 22 fixed thereto, in causing the tongue which is provided thereon, to arrive at the other end of armature 21, where it exerts pressure and where, on displacing same, moves switch 17 coupled thereto, effecting that the mobile way of same cut the current precisely when the fourth turn of shaft 26 finishes, said current being sent to the butt connecting motor 14, in agreement with the positioning illustrated in attached drawing, corresponding to Figure 1. Motor 14 will start turning again, repeating the entire above described process, with the same motions and effects, commencing from the action of thermal switch 15. The duration of this period of activity of the apparatus, always automatically repeating the same operation, in the order given and as often as desired, will depend on the extension given to the butts seating on commutator 11 owing to the fact that the clock, which continues functioning, by means of bushing 12 will cause said commutator to turn. The contact in this position being ended, the apparatus will remain inactive until the brush seating on commutator 11 encounters another contact stop in the course of its travel.

Evidently, for the practical execution of the apparatus according to this invention, the most suitable materials may be employed, and constructive modifications of details may be introduced without thereby departing from the essential nature of the invention.

I claim:

1. An apparatus for the automatic sending of electric signals indicating the level of a body of water prevailing at the signaling time and at the place in said body where the apparatus is installed, said apparatus comprising a frame, float means movably mounted in said frame, a plurality of movable contact means arranged in said frame, electromagnetic means for moving said contact means, three rotatable members each carrying a series of projections each adapted in a certain position of rotation of its member for signaling contact with one of said contact means, said projections resembling the visual representation of Morse signals and establishing contacts for different intervals of time, one of said rotatable members having signal contacts for the sending of a signal identifying the location of the apparatus, a second one of said rotatable members having contacts enabling the sending of signals indicating the full meter measurement of the level prevailing at said location, a third one of said rotatable members having contacts enabling the sending of signals each indicating the excess in centimeters over the measurement of the level in full meters, means controlled by said float means for positioning the contact means for the second rotatable means, means controlled by said float means for positioning the contact means for the said third rotatable member, a source of current, an electric motor, time control means for periodically connecting said source to said motor, a shaft connected to said rotatable members, means for connecting said shaft to said motor, means controlled by said shaft for connecting the electromagnetic means moving the contact means of said first rotatable member to said source, means controlled by said shaft for connecting the electromagnetic means moving the contact means of the second rotatable member to said source subsequent to the energization of the electromagnetic means moving the contact means of the first rotatable member, means controlled by said shaft connecting the electromagnetic means moving the contacts of the third rotatable member to said source subsequent to the energization of the electromagnetic means moving the contact means of the second rotatable member, means coacting with the said shaft for disconnecting said motor from said source after a predetermined number of rotations of said rotatable members, means for storing energy during the rotation of the rotatable members prior to said disconnection and effective in rotating said shaft in the opposite direction after the disconnection of said motor from said source, electric signal means electrically connected to said contact means and by said shaft to said rotatable members and sending Morse signals predetermined by the identity of the contact projections on said rotatable members.

2. An apparatus as defined in claim 1 and wherein the contacting means for said first rotatable member is a rotatable rod rotated by one of said electromagnetic means and carrying a tongue for contact with one of the projections on said first rotatable member.

3. Apparatus as defined in claim 1 and wherein each of said rotatable members is a cylinder carrying contact projections on its peripheral surface.

4. Apparatus as defined in claim 1 and wherein the contact means for the second rotatable member is a rotatable sleeve rotated by one of said electromagnetic means and carrying a tongue for contact with the projections on said second rotatable member.

5. Apparatus as defined in claim 1 and wherein the means for positioning the contact means for the second rotatable member is a lever controlled by said float means.

6. Apparatus as defined in claim 1 and wherein a thermostatic switch is provided delaying the connection of said source to said motor until said signal means is in operable condition.

7. Apparatus as recited in claim 1 and wherein said means for disconnecting said motor from source is a rack moved by a pinion on said shaft and a lever swung by said rack.

8. Apparatus as recited in claim 1 and wherein said signal means includes an oscillator for radio signals.

9. Apparatus as recited in claim 1 and wherein said signal means includes a pair of electric lamps one of which signals, the other of said lamps lighting up after a predetermined decline of the power of said source.

10. Apparatus as recited in claim 1 and wherein the means for connecting said shaft to said motor is a pawl-and-ratchet mechanism.

CARLOS HANSEN.

REFERENCES CITED

The following references are of record in the file of this patent:

UNITED STATES PATENTS

| Number | Name | Date |
| --- | --- | --- |
| 1,972,289 | Chauveau | Sept. 4, 1934 |
| 2,148,075 | Kiner | Feb. 21, 1939 |
| 2,202,517 | Koevend | May 28, 1940 |
| 2,207,769 | White | July 16, 1940 |
| 2,239,094 | Harvey | Apr. 22, 1941 |